(12) United States Patent
Alwan et al.

(10) Patent No.: US 9,725,118 B2
(45) Date of Patent: Aug. 8, 2017

(54) VEHICLE SILL REINFORCEMENT

(71) Applicant: Ford Global Technologies, LLC, Dearborn, MI (US)

(72) Inventors: Jamil M. Alwan, Ann Arbor, MI (US); Abdelmonaam Sassi, Windsor (CA); Thiag Subbian, Farmington Hills, MI (US); Djamal Eddine Midoun, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/279,528

(22) Filed: Sep. 29, 2016

(65) Prior Publication Data

US 2017/0080980 A1    Mar. 23, 2017

Related U.S. Application Data

(63) Continuation of application No. 14/856,927, filed on Sep. 17, 2015, now Pat. No. 9,493,190.

(51) Int. Cl.
| | |
|---|---|
| *B62D 25/20* | (2006.01) |
| *B62D 21/15* | (2006.01) |
| *B62D 25/02* | (2006.01) |
| *B60K 1/04* | (2006.01) |

(52) U.S. Cl.
CPC .............. *B62D 21/157* (2013.01); *B60K 1/04* (2013.01); *B62D 25/025* (2013.01); *B60K 2001/0438* (2013.01); *B60Y 2306/01* (2013.01)

(58) Field of Classification Search
CPC . B62D 25/025; B62D 25/2036; B62D 21/157

USPC ............... 296/209; 52/783.17, 783.18, 797.1
See application file for complete search history.

(56) References Cited

U.S. PATENT DOCUMENTS

| | | | | |
|---|---|---|---|---|
| 3,534,463 | A | * | 10/1970 | Molin .................... B21D 47/00 228/185 |
| 4,841,708 | A | | 6/1989 | Johnston |
| 4,955,570 | A | | 9/1990 | Benz |
| 5,186,605 | A | | 2/1993 | Tracy |
| 5,203,194 | A | | 4/1993 | Marquardt |
| 6,003,283 | A | * | 12/1999 | Hull ........................ E04C 2/365 52/783.15 |
| 6,357,819 | B1 | * | 3/2002 | Yoshino .................. B29C 44/18 296/187.02 |
| 6,409,257 | B1 | | 6/2002 | Takashina et al. |

(Continued)

FOREIGN PATENT DOCUMENTS

CN          201347128 Y     11/2009

*Primary Examiner* — Dennis H Pedder
(74) *Attorney, Agent, or Firm* — Frank MacKenzie; Bejin Bieneman PLC

(57) ABSTRACT

A vehicle sill reinforcement includes a first elongate member and a second elongate member. Each of the first elongate member and the second elongate member includes steps and walls disposed in alternating arrangement along an axis. The walls of the first elongate member are fixed to the walls of the second elongate member. The steps of the first elongate member and the steps of the second elongate member are aligned along the axis and define cavities therebetween. The steps and walls of the sill reinforcement resist buckling in response to both vertical and horizontal components of impact force applied to the sill reinforcement.

16 Claims, 4 Drawing Sheets

(56) References Cited

U.S. PATENT DOCUMENTS

| | | | |
|---|---|---|---|
| 8,317,258 B2* | 11/2012 | Honda | B62D 21/15 |
| | | | 296/205 |
| 8,696,051 B2 | 4/2014 | Charbonneau et al. | |
| 2002/0043821 A1 | 4/2002 | Takashina et al. | |
| 2012/0086238 A1 | 4/2012 | Tan | |
| 2013/0009424 A1 | 1/2013 | Herntier | |
| 2015/0158532 A1* | 6/2015 | Ayuzawa | B62D 25/2009 |
| | | | 296/193.07 |
| 2015/0360725 A1 | 12/2015 | Yoshida | |
| 2017/0072886 A1* | 3/2017 | Wylezinski | B60R 19/56 |

\* cited by examiner

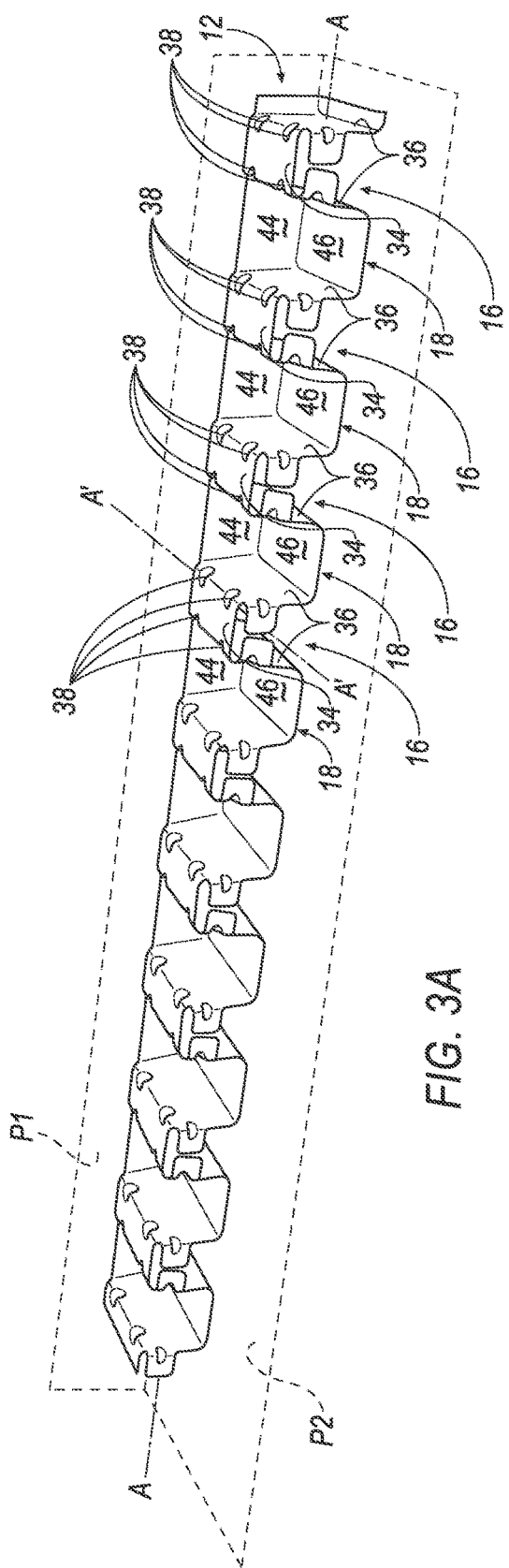
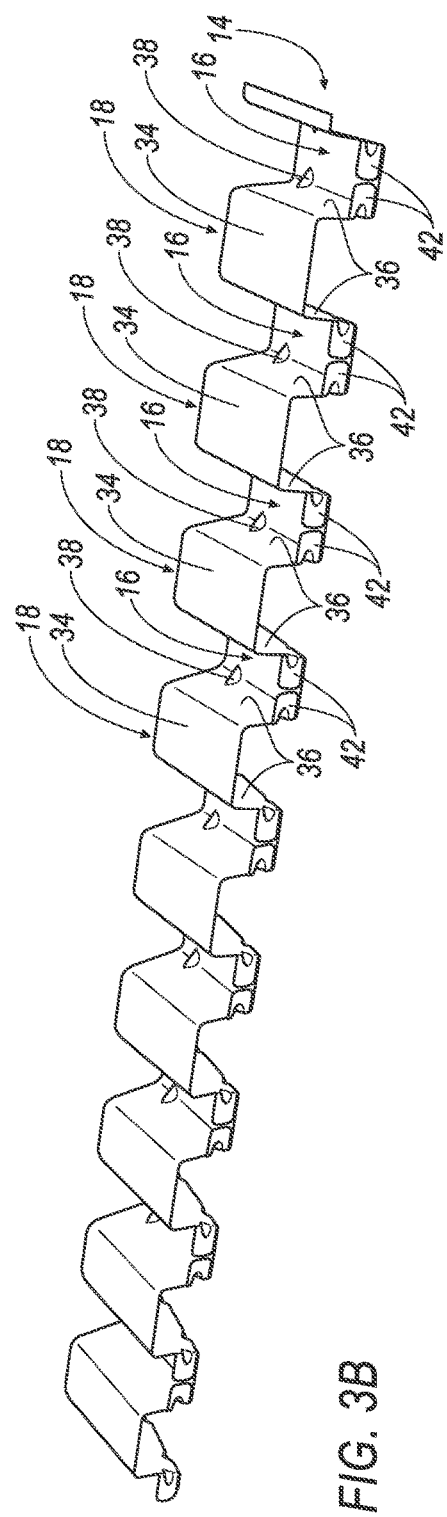
FIG. 3A
FIG. 3B

VEHICLE SILL REINFORCEMENT

This patent application is a continuation of and claims priority to and all advantages of U.S. patent application Ser. No. 14/856,927 filed on Sep. 17, 2015, which is expressly incorporated herein by reference.

BACKGROUND

A vehicle may include a body and exterior panels supported on the body. The exterior panels may be, for example, rocker panels, door panels, fenders, etc. Upon a side impact of a vehicle, an impact force created from the side impact may deform the exterior panels. In this case, the force may be delivered through the exterior panels to the body, and the body may absorb some of the impact force during the side impact.

Depending on the direction of impact, and magnitude and direction of energy absorption by the exterior panels, the force delivered to the body may be uneven and in a variety of directions. For example, the impact force may include a horizontal component, i.e., a cross-vehicle direction, and/or a vertical component, i.e., in a direction upward or downward. The magnitude of these horizontal and vertical components of the impact force may influence the deformation of the exterior panels. For example, during the side impact, the impact force may twist, bend, and/or crush the structural components of the vehicle.

The design of the impact absorbing capability of the exterior panels and the frame may be subject to several logistical constraints, such as packaging constraints, manufacturing constraints, vehicle assembly constraints, cost constraints, etc. Therefore, there remains an opportunity to design vehicle components that may be capable of absorbing various impact forces that may also satisfy logistical constraints.

BRIEF DESCRIPTION OF THE DRAWINGS

FIG. 3A is a perspective view of a first elongate member of the sill reinforcement.

FIG. 3B is a perspective view of a second elongate member of the sill reinforcement.

DETAILED DESCRIPTION

Figure 1:
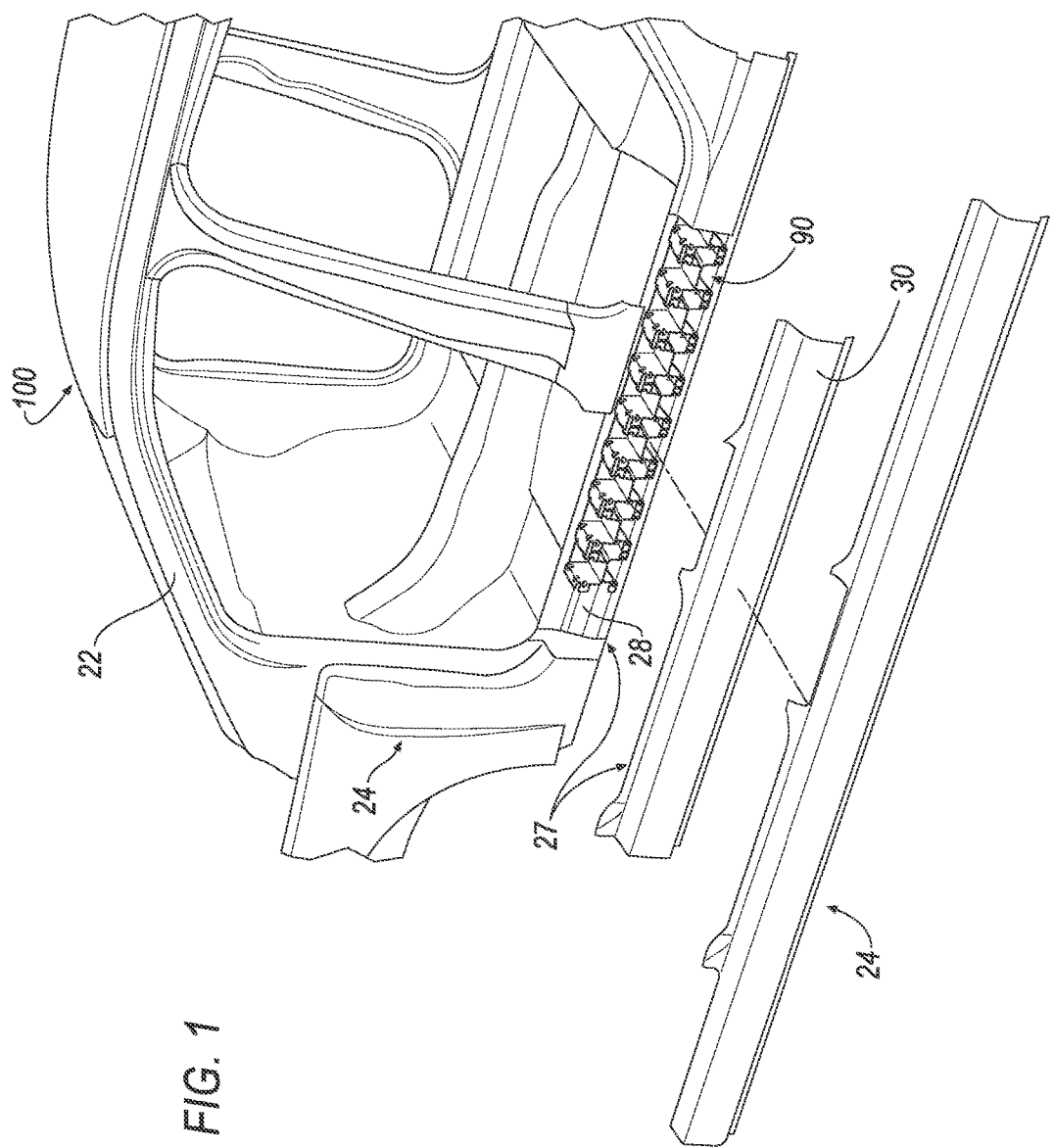
FIG. 1 is a perspective view of a body assembly of a vehicle including a sill inner, a sill outer, and a sill reinforcement disposed between the sill inner and the sill outer.

With reference to the Figures, wherein like numerals indicate like parts throughout the several views, a sill reinforcement 90 for a vehicle 100 includes a first elongate member 12 and a second elongate member 14. Each of the first elongate member 12 and the second elongate member 14 includes steps 16 and walls 18 disposed in alternating arrangement along an axis A. The walls 18 of the first elongate member 12 are fixed to the walls 18 of the second elongate member 14. The steps 16 of the first elongate member 12 and the steps 16 of the second elongate member 14 are aligned along the axis A and define cavities 20 therebetween.

During a side impact, the steps 16 and the walls 18 of both the first elongate member 12 and the second elongate member 14 of the sill reinforcement 90 may deform to absorb an impact force F, such as a force from a pole impact, vehicle-to-vehicle impact, etc. The first elongate member 12 and/or the second elongate member 14 may receive the impact force F and may absorb the impact force F and/or transfer the impact force F to the other through the walls 18 and/or the steps 16. The alternating arrangement of the steps 16 and walls 18 along the axis A stabilizes the sill reinforcement 90 during the side impact, as described further below. During the side impact, the steps 16 may deform into the cavities 20. The sill reinforcement 90 may be compact, i.e., occupy less space, to meet packaging constraints of the vehicle 100, due in part to the alignment of the steps 16 of the first elongate member 12 and the second elongate member 14 along the axis A and the alternating arrangement of the steps 16 and walls 18 along the axis A.

The sill reinforcement 90 may absorb impact forces F directed from multiple directions. For example, a second vehicle may impact the vehicle 100 at any angle. Depending on the angle of impact, the sill reinforcement 90 may resist bending, twisting, and/or crushing, e.g., forces from a pole impact.

With reference to FIG. 1, the vehicle 100 includes a body assembly 22 and exterior panels 24. The body assembly 22 includes a sill assembly 27 housing the sill reinforcement 90. The sill assembly 27 may include a sill inner 28 and a sill outer 30 fixed to the sill inner 28. The sill inner 28 and the sill outer 30 may each be elongated along the axis A and the sill reinforcement 90 may be disposed between the sill inner 28 and the sill outer 30. The exterior panels 24 may cover the sill inner 28 and the sill outer 30. The body assembly 22 may include two sill assemblies spaced from each other in a cross-vehicle direction, i.e., one on a left side of the vehicle 100 and one on a right side of the vehicle 100.

The sill outer 30 and the sill inner 28 may be fixed to each other in any suitable manner, e.g., welding, fastening, etc. Any suitable material, e.g., steel, aluminum, etc., may form the body assembly 22, including the sill inner 28 and/or the sill outer 30. The exterior panels 24 may be, for example, rocker panels, door panels, fenders, etc. Any suitable material, e.g., steel, aluminum, etc., may form the exterior panels 24.

Figure 4:
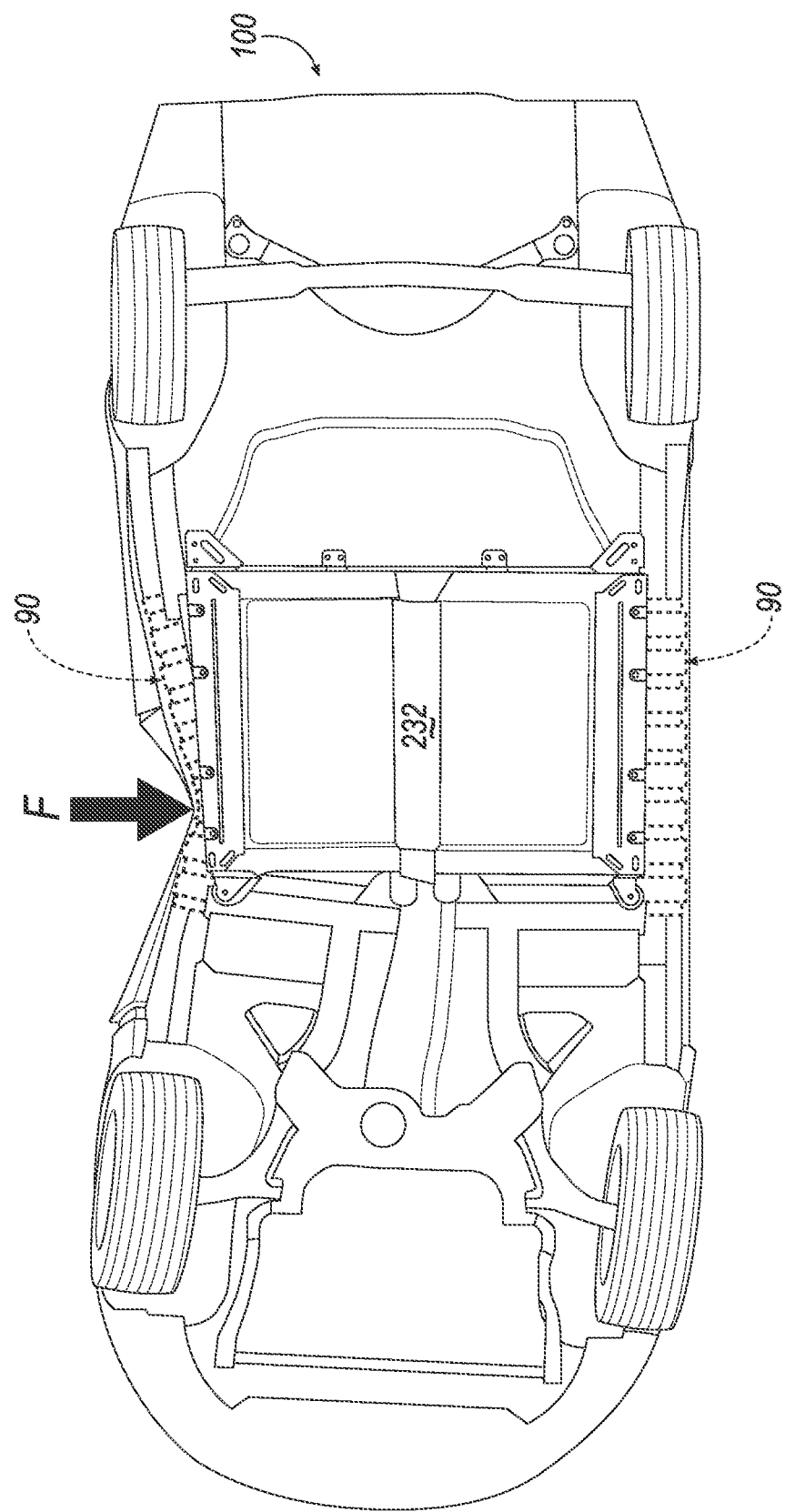
FIG. 4 is a bottom view of the vehicle with the sill reinforcements shown in hidden lines and with an impact for bending one of the sill reinforcements.

The vehicle 100 may be an electric vehicle. As shown in FIG. 4, the vehicle 100 may include a battery compartment 232 between the sill assemblies 26. The battery compartment 232 may house batteries. The battery compartment 232 may extend from one sill assembly 27 to the other sill assembly 27. The battery compartment 232 may create packaging constraints along the sill assemblies, and the sill reinforcement 90 may limit deformation of the sill assembly 27 to reduce the magnitude and likelihood of intrusion into the battery compartment 232 during a vehicle impact. Further, the batteries may add weight to the vehicle 100, thus leading to a need for increased energy absorption. The sill reinforcement 90 may be configured to absorb this added energy absorption. As shown in FIG. 4, the sill reinforcement 90 of the electric vehicle 100 may resist deformation to absorb the impact force F and reduce and/or prevent damage to the battery from the impact force F.

Figures 2A, 2B:
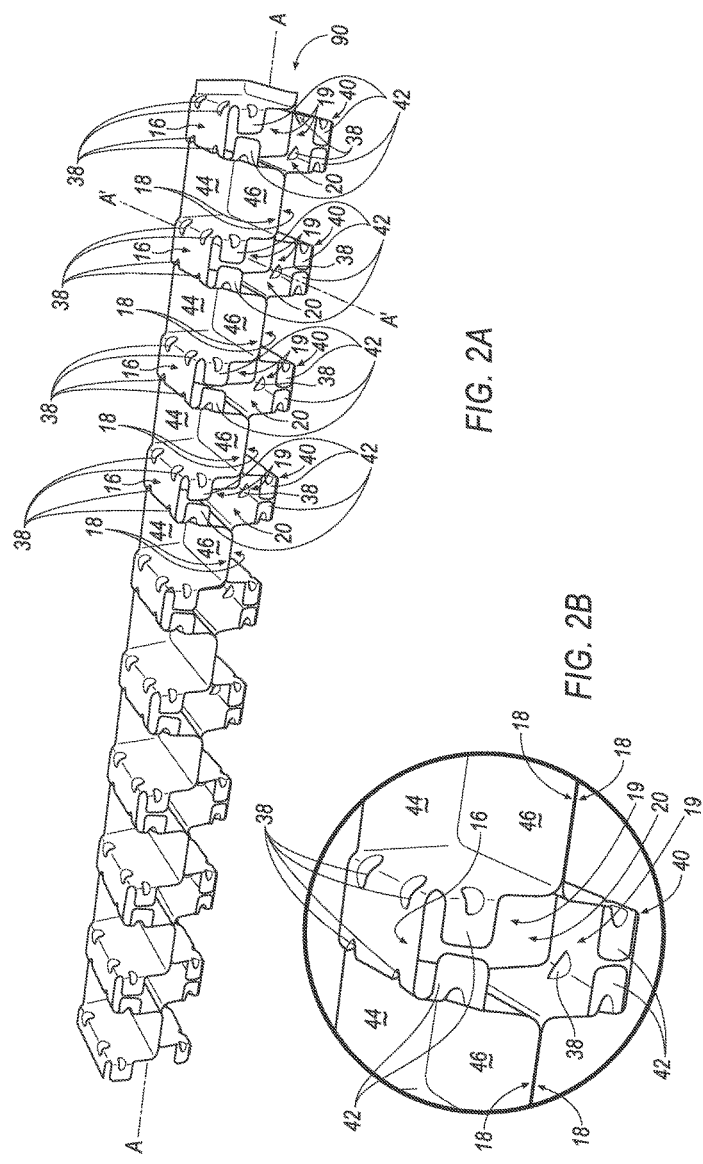
FIG. 2A is a perspective view of the vehicle sill reinforcement.
FIG. 2B is an enlarged view of a portion of FIG. 2A.

As shown in FIGS. 2A-B, the steps 16 of the first elongate member 12 may be aligned with the steps 16 of the second elongate member 14. The steps 16 may have a concave shape relative to the axis A. As shown in FIGS. 3A-B, the steps 16 may each include a spine 34 and a pair of legs 36 spaced from each other and extending in a common direction from the spine 34. In other words, the steps 16 may be U-shaped. The legs 36 may extend generally perpendicularly from the spine 34 or, alternatively, the legs 36 may extend at any suitable angle from the spine 34.

The legs 36 of each of the steps 16 may be adjoined to, i.e., directly connected to, adjacent walls 18. The steps 16 may include ribs 38 extending between legs 36 of the steps 16 and adjacent walls 18. The ribs 38 may support the sill reinforcement 90 and/or modify the capability of the sill reinforcement 90 to absorb the impact force F.

The steps 16 of the first elongate member 12 and the steps 16 of the second elongate member 14, i.e., corresponding pairs of the steps 16, define boxes 40 spaced from each other along the axis A. With reference to FIGS. 2A-B, the boxes 40 define the cavities 20. The cavities 20 each have open ends 19 spaced from each other along a second axis A2 transverse to the axis A. For example, the second axis A' may be perpendicular to the axis A. The cavities 20 may be configured to receive a welding instrument, e.g., may be sized and shaped to receive the welding instrument, for welding the sill reinforcement 90 of the sill inner 28 and/or the sill outer 30 of the sill assembly 27. The welding instrument may, for example, weld the sill reinforcement 90 to the sill inner 28 and/or sill outer 30.

The sill reinforcement 90 may include a flange 42 extending from the steps 16 into the cavities 20. The flange 42 may be formed of the same material of the steps 16. The flange 42 may be integrally formed with the steps 16, i.e., formed simultaneously as a single unit. For example, the flange 42 may be formed with the steps 16 by a stamping process, as set forth further below. However, the flange 42 may be formed of any suitable material and by any suitable process. The flange 42 may fix the sill reinforcement 90 to the body assembly 22, such as the sill inner 28 and/or the sill outer 30. For example, the flange 42 may be welded to the body assembly 22, e.g., the sill inner 28 and/or the sill outer 30. The cavities 20 may provide welding instrument access, as set forth above.

The walls 18 of the first elongate member 12 abut the walls 18 of the second elongate member 14, as shown in FIGS. 2A-B. The walls 18 of the first elongate member 12 may be fixed to the walls 18 of the second elongate member 14 by any suitable manner, e.g., welding, adhering, fastening, etc.

As shown in FIGS. 2A-B and FIGS. 3A-B, each wall 18 of the first elongate member 12 may include an inner leg 44 and an outer leg 46 that adjoins, i.e., is directly connected to, and extends transverse to the inner leg 44. The outer leg 46 of the first elongate member 12 may be fixed to the wall 18 of the second elongate member 14 in any suitable manner e.g., welding, adhering, fastening, etc. The inner leg 44 and the outer leg 46 of each wall 18 of the first elongate member 12 may extend between and adjoin, i.e., directly connected to, adjacent steps of the first elongate member 12.

The inner legs 44 may extend in a first plane P1 and the outer legs 46 may extend in a second plane P2 that is different than the first plane P1, as shown in Figure. Specifically, the inner legs 44 may extend perpendicularly from the outer legs 46. The outer legs 46 may extend in the second plane P2. As set forth above, the inner legs 44 may extend in the first plane P1. The second plane P2 may be parallel to the second axis A', and the first plane P1 may be perpendicular to the second axis A'. Said differently, as set forth above, the axis A may be perpendicular to the second axis A', and the outer legs 46 may be perpendicular to the axis A and the inner legs 44 may be parallel with the axis A. However, the inner legs 44 may extend from the outer legs 46 at any suitable angle. The inner legs 44 may be fixed to the sill inner 28 and/or the sill outer 30 in any suitable manner, e.g., welded, adhered, fastened, etc. The cavities 20, as set forth above, may provide welding instrument access to weld the inner legs 44 to the sill inner 28 and/or the sill outer 30.

The walls 18 and steps 16 of the first elongate member 12 may be integrally formed with each other, and the walls 18 and steps 16 of the second elongate member 14 may be integrally formed with each other, i.e., formed simultaneously as a single unit. Specifically, the inner leg 44, outer leg 46, and steps 16 of the first elongate member 12 may be integrally formed with each other. The first elongate member 12 may be formed from a single piece of material, and the second elongate member 14 may be formed from a single piece of material. For example, the first elongate member 14 and/or the second elongate member 16 of the sill reinforcement 90 may each be separately formed by a stamping process. Specifically, the first elongate member 12 and the second elongate member 14 may be separately stamped and subsequently assembled together, as set forth above, by fixing the outer legs 46 of the first elongate member 12 to the outer legs 46 of the second elongate member 14. Alternatively, the walls 18 and steps 16 of the first elongate member 12 and/or the second elongate member 14 may be formed separately and subsequently assembled together. In any event, the walls 18 and steps 16 of the first elongate member 12 are fixed to each other and the walls 18 and steps 16 of the second elongate member 14 are fixed to each other.

The first elongate member 12 and the second elongate member 14 may each be formed of any suitable type of material. The first elongate member 12 and the second elongate member 14 may be formed of the same type of material or different types of material. The first elongate member 12 and/or the second elongate member 14 may be formed of a high strength material having a yield strength at or above 900 mPa. For example, the first elongate member 12 and/or the second elongate member 14 may be formed of metal, such as steel, aluminum, etc. As another example, the first elongate member 12 and/or the second elongate member 14 may be formed of a polymeric material.

The impact force F may include a horizontal component, i.e., directed toward the side of the vehicle, and a vertical component, i.e., directed toward a top or a bottom of the vehicle 100. The sill reinforcement 90 is configured to resist buckling due to both the horizontal component and the vertical component of the impact force F. The outer leg 46 may support the boxes 40 by absorbing the impact force F from the boxes 40 and each of the inner leg 44 and the outer leg 46 may transfer the impact force F to the other, stabilizing the sill reinforcement 90. In this configuration, the walls 18 and the boxes 40 of the sill reinforcement 90 of the vehicle 100 may resist deformation, e.g., to limit intrusion into the battery compartment by resisting bending, crushing.

The boxes 40, the outer legs 46 of the first elongate member 12, and the wall 18 of the second elongate member 14 may deform to absorb the horizontal component of the impact force F. The boxes 40 and the walls 18 are configured to resist buckling of the sill reinforcement 90 due to the horizontal component of the impact force F. Specifically, during the absorption of the horizontal component of the impact force F, the extension of the boxes 40, the outer legs 46 of the first elongate member 12, and the wall 18 of the second elongate member 14 along the second axis A', and the interconnection of these components, resist buckling about a vertical axis in response to the horizontal component of the impact force F.

The boxes 40 and the inner legs 44 of the first elongate member 12 may deform to absorb the vertical component of the impact force F. The boxes 40 and the inner legs 44 are configured to resist buckling of the sill reinforcement 90 due to the vertical component of the impact force F. Specifically, during absorption of the vertical component of the impact force F, the extension of the inner legs 44 in the second plane P2, and the interconnection of the boxes 40 and the inner legs 44, resist buckling about a horizontal axis in response to the vertical component of the impact force F.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle body assembly comprising:
a sill inner and a sill outer fixed to the sill inner and each elongated along an axis; and
a vehicle sill reinforcement disposed between the sill inner and the sill outer;
the vehicle sill reinforcement including a first elongate member including steps and walls disposed in alternating arrangement along the axis;
the vehicle sill reinforcement including a second elongate member including steps and walls disposed in alternating arrangement along the axis;
the walls of the first elongate member abutting the walls of the second elongate member; and
the steps of the first elongate member and the steps of the second elongate member being aligned with each other along the axis, the steps of the first elongate member and the steps of the second elongate member defining cavities therebetween, the cavities extending along a second axis intersecting the sill inner and the sill outer.

2. The vehicle body assembly as set forth in claim 1 wherein the walls of the first elongate member and the walls of the second elongate member are aligned with each other along the axis.

3. The vehicle body assembly as set forth in claim 1 wherein each wall of the first elongate member includes an inner leg and an outer leg adjoining and extending in a direction transverse to the inner leg.

4. The vehicle body assembly as set forth in claim 3 wherein each inner leg and outer leg extends between and adjoins a successive pair of the steps of the first elongate member.

5. The vehicle body assembly as set forth in claim 3 wherein the inner legs extend in a first plane and the outer legs extend in a second plane different than the first plane of the inner legs.

6. The vehicle body assembly as set forth in claim 5 wherein each cavity extends between open ends spaced along second axes transverse to the first plane.

7. The vehicle body assembly as set forth in claim 3 wherein a boundary between the inner legs and the outer legs extends along the axis.

8. The vehicle body assembly as set forth in claim 3 wherein the wall of the second elongate member is fixed to the outer leg of the first elongate member.

9. The vehicle body assembly as set forth in claim 3 wherein the inner legs are fixed to one of the inner sill and the outer sill.

10. The vehicle body assembly as set forth in claim 3 wherein the respective inner leg and outer leg of each wall of the first elongate member are aligned with each other along the axis.

11. The vehicle body assembly as set forth in claim 1 wherein the walls of the first elongate member are welded to the walls of the second elongate member.

12. The vehicle body assembly as set forth in claim 1 wherein the cavities are configured to receive a weld head.

13. The vehicle body assembly as set forth in claim 1 further comprising a flange extending from the steps into the cavities.

14. The vehicle body assembly as set forth in claim 1 wherein the cavities are elongated along the second axes.

15. The vehicle body assembly as set forth in claim 1 wherein the walls and the steps of the first elongate member are integral with each other.

16. The vehicle body assembly as set forth in claim 1 wherein the first elongate member and the second elongate member are each elongated the axis.

* * * * *